United States Patent
Hodges et al.

(10) Patent No.: US 10,147,155 B2
(45) Date of Patent: Dec. 4, 2018

(54) IMAGE PERSPECTIVE PROCESSING

(71) Applicant: Visual Supply Company, Oakland, CA (US)

(72) Inventors: Zachary Daniel Hodges, Orinda, CA (US); Robert A. Newport, Oakland, CA (US); Rekil Prashanth, Oakland, CA (US)

(73) Assignee: Visual Supply Company, Oakland, CA (US)

( * ) Notice: Subject to any disclaimer, the term of this patent is extended or adjusted under 35 U.S.C. 154(b) by 0 days.

(21) Appl. No.: 14/555,177

(22) Filed: Nov. 26, 2014

(65) Prior Publication Data

US 2016/0148340 A1    May 26, 2016

(51) Int. Cl.
*G06T 1/00* (2006.01)
*G06T 5/00* (2006.01)
*G06T 3/60* (2006.01)

(52) U.S. Cl.
CPC .............. *G06T 1/00* (2013.01); *G06T 3/608* (2013.01); *G06T 5/00* (2013.01)

(58) Field of Classification Search
None
See application file for complete search history.

(56) References Cited

U.S. PATENT DOCUMENTS

| | | | |
|---|---|---|---|
| 4,267,573 A * | 5/1981 | Chaikin et al. | 382/296 |
| 5,175,808 A * | 12/1992 | Sayre | 345/647 |
| 5,465,121 A * | 11/1995 | Blalock et al. | 348/744 |
| 6,367,933 B1 * | 4/2002 | Chen | H04N 3/2335 348/744 |
| 7,352,913 B2 * | 4/2008 | Karuta | G02B 27/0025 348/746 |
| 2005/0216841 A1 * | 9/2005 | Acker et al. | 715/730 |
| 2006/0036950 A1 * | 2/2006 | Himberger | G06F 3/0481 715/732 |
| 2007/0030575 A1 * | 2/2007 | Yen | G02B 7/102 359/676 |
| 2007/0058373 A1 * | 3/2007 | Yoshimura et al. | 362/294 |
| 2009/0058883 A1 * | 3/2009 | Piotrowski | G06T 15/04 345/656 |
| 2009/0297060 A1 * | 12/2009 | Hattori | 382/275 |
| 2011/0249073 A1 * | 10/2011 | Cranfill | H04N 7/147 348/14.02 |

OTHER PUBLICATIONS

Photoshop ("How to use the Photoshop Free Transform mode | lyndia.com tutorial", YouTube Video published at https://www.youtube.com/watch?v=Bi4jJnYLkUA as of Apr. 29, 2010 and archived at http://web.archive.org/web/20100713121709/http://www.youtube.com/watch?v=Bi4jJnYLkUA as of Jul. 13, 2010).*
Evening, Martin, "Adobe Photoshop CS3 for Photographers", Focal Press, 2007, pp. 403-405.*

* cited by examiner

*Primary Examiner* — William A Beutel
(74) *Attorney, Agent, or Firm* — Schwegman Lundberg & Woessner, P.A.

(57) ABSTRACT

Methods, systems, and apparatus for adjusting a perspective of an image are described. Pixels from each of a plurality of rows of the image are removed, where the count of pixels removed is based on a location of the corresponding row in the image. In one example embodiment, the image is rotated prior to and after removal of the pixels based on the type of perspective alteration.

18 Claims, 10 Drawing Sheets

IMAGE PERSPECTIVE PROCESSING

TECHNICAL FIELD

The present application relates generally to image processing, and more specifically, in one example, to processing a perspective of an image.

BACKGROUND

Images are typically represented by pixels formatted in a matrix comprising rows and columns. Each pixel is associated with one or more pixel parameters, such as one or more intensity values. For a monochrome image, a pixel may have one intensity value, and for a color image, a pixel may have three or four intensity values. In addition, each pixel may be characterized by color, hue, and the like.

Images are also characterized by a perspective of the image. Perspective, in this context, refers to how objects, such as buildings, are viewed by the human eye based on spatial considerations and dimensions. For example, the spatial relationship between the eye and the object helps to determine the perspective. Images, such as still images, video images, and the like, are processed using a variety of techniques and tools to adjust the intensity, hue, sharpness, and/or perspective of an image.

BRIEF DESCRIPTION OF THE DRAWINGS

Some embodiments are illustrated by way of example and not limitation in the figures of the accompanying drawings, in which.

DETAILED DESCRIPTION

Figure 1:
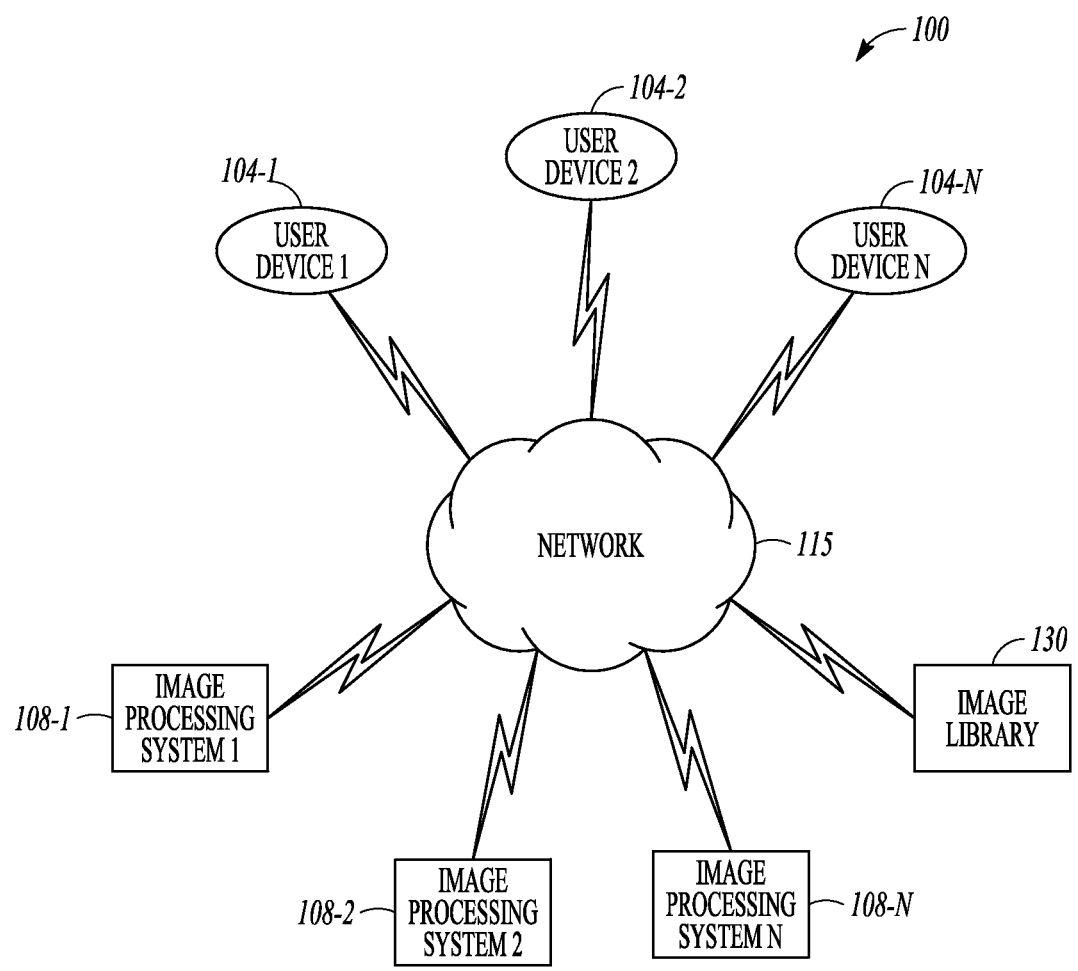
FIG. 1 shows a block diagram of an example system for altering a perspective of an image, in accordance with an example embodiment.

In the following detailed description of example embodiments, reference is made to specific examples by way of drawings and illustrations. These examples are described in sufficient detail to enable those skilled in the art to practice these example embodiments, and serve to illustrate how the invention may be applied to various purposes or embodiments. Other embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims. It is understood, that in various embodiments, that the operations and actions described herein can be performed by one or more processors of a mobile device executing an image processing application.

Generally, methods, systems, apparatus, and articles of manufacture for processing images are described. In one example embodiment, a perspective of an image is manipulated to produce a modified image that appears to narrow towards one edge of the image, such as a top side, bottom side, left side, or right side of the image. This creates a perspective that is similar to what a person sees when viewing a tall building from the base of the building; the sides of the tall building have the appearance of gradually narrowing toward the top of the building.

The disclosed image processing may operate on an image side basis, meaning that one side of the image gradually narrows independently from the gradual narrowing of another side of the image. In one example embodiment, to gradually narrow the right side of the image, for example, the image may be rotated so that the right side of the image is the top side of the rotated image and the left side of the image is the bottom side of the rotated image. Each row of pixels is modified to gradually narrow the picture towards the top of the image (the original right side of the image). After all rows have been processed, the image may then be rotated back to its original position. This technique allows the same method to be used regardless of the side that is selected for reduction.

In one example embodiment, a perspective of an image is altered by changing the image on a line-by-line, row-by-row, or column-by-column basis. For example, the perspective of an image may be altered by discarding pixels in one or more lines of an image. In one example embodiment, every xth pixel in a first row of pixels of an image is discarded, every yth pixel in a second row of pixels of an image is discarded, every zth pixel in a third row of pixels of an image is discarded, and so on. In one example embodiment, every nth pixel in a first row of pixels of an image is discarded where n equals the original number of pixels multiplied by a perspective reduction factor. The perspective reduction factor may be, for example, 10%, meaning that 10% of the pixels are removed to create the narrowest row or column of the altered image.

FIG. 1 shows a block diagram of an example system 100 for altering a perspective of an image, in accordance with an example embodiment. In one example embodiment, the system 100 may comprise one or more user devices 104-1, 104-2, and 104-N (known as user devices 104 hereinafter), one or more image processing systems 108-1, 108-2 and 108-N (known as image processing systems 108 hereinafter), a network 115, and an image library 130. Each of the user devices 104 (e.g., 104-1) may be a personal computer (PC), a mobile phone, a personal digital assistant (PDA), or any other appropriate computer device. Each user device (104-1, 104-2, or 104-N) may include a user interface module that may comprise a web browser program and/or an application user interface. Although a detailed description is only illustrated for user device 104-1, it is noted that each of the other user devices (e.g., user device 104-2 through user device 104-N) may have corresponding elements with the same functionality. In one example embodiment, the user devices 104 are capable of altering a perspective of an image, as described more fully below Each of the image processing systems 108 may be a server, client, or other processing device that includes an operating system for executing software instructions. The image processing systems 108 are capable of altering a perspective of an image, as described more fully below. The image library 130 may store images before processing and/or after processing.

The network 115 may be a local area network (LAN), a wireless network, a metropolitan area network (MAN), a wide area network (WAN), a wireless network, a network of interconnected networks, the public switched telephone network (PSTN), and the like.

Figure 2:
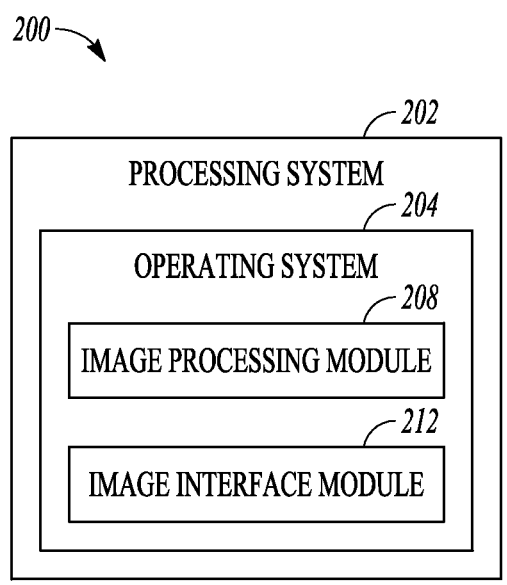
FIG. 2 is a block diagram of an example apparatus for altering a perspective of an image, in accordance with an example embodiment.

FIG. 2 is a block diagram of an example apparatus 200 for altering a perspective of an image, in accordance with an example embodiment. The apparatus 200 is shown to include a processing system 202 that may be implemented on a client or other processing device, which includes an operating system 204 for executing software instructions. The apparatus 200 may be implemented as any of the client device(s) 104 and/or the image processing system(s) 108 of FIG. 1. In accordance with an example embodiment, the apparatus 200 may include an image processing module 208 and an image interface module 212.

The image processing module 208 is configured to perform one or more image processing techniques related to altering a perspective of an image, as described more fully below. The image interface module 212 is configured to obtain an image or portion of an image and store a processed image or portion of an image. The image may be obtained and stored on a full image basis, a line-by-line basis, a row-by-row basis, a column-by-column basis, and the like. In one example embodiment, the image interface module 212 modifies a stored image without obtaining the image on a line-by-line basis, row-by-row basis, or column-by-column basis by changing the storage location in an image store of one or more pixels of the image.

Figure 3A:
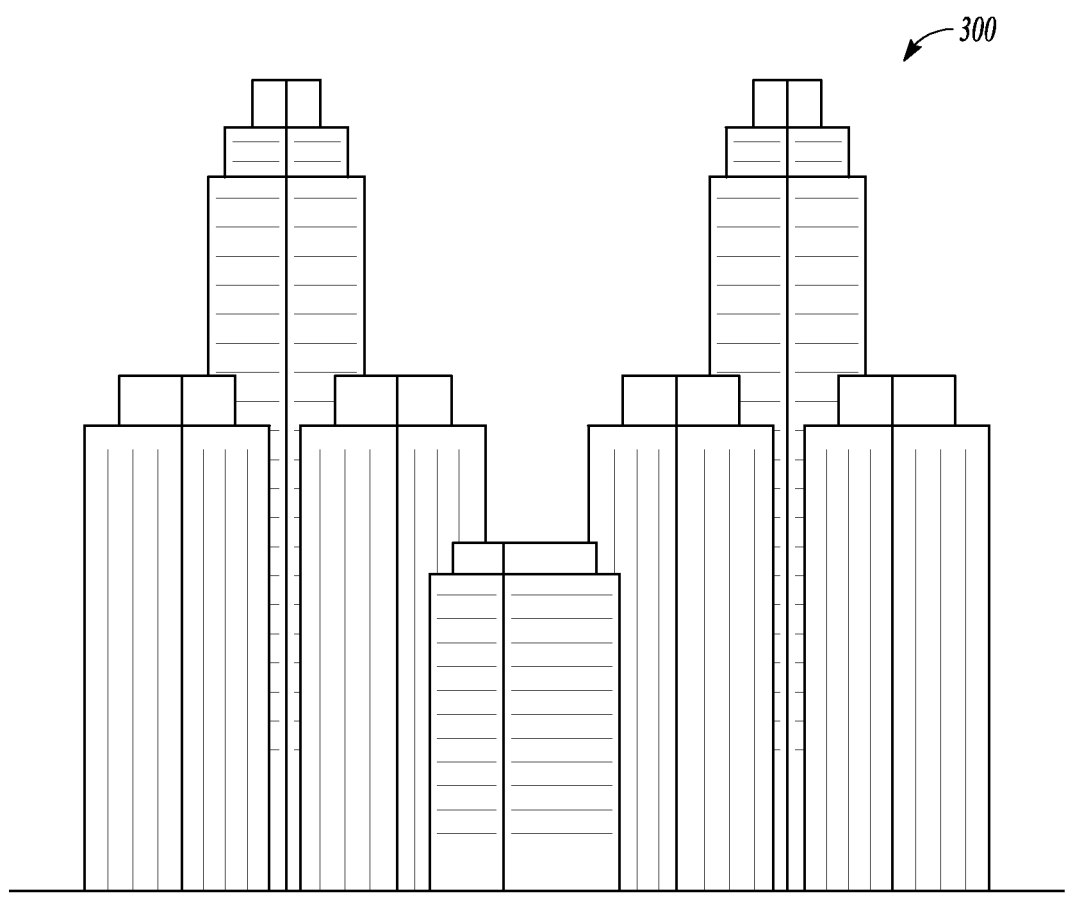
FIG. 3A shows an example landscape image, in accordance with an example embodiment.
Figure 3B:
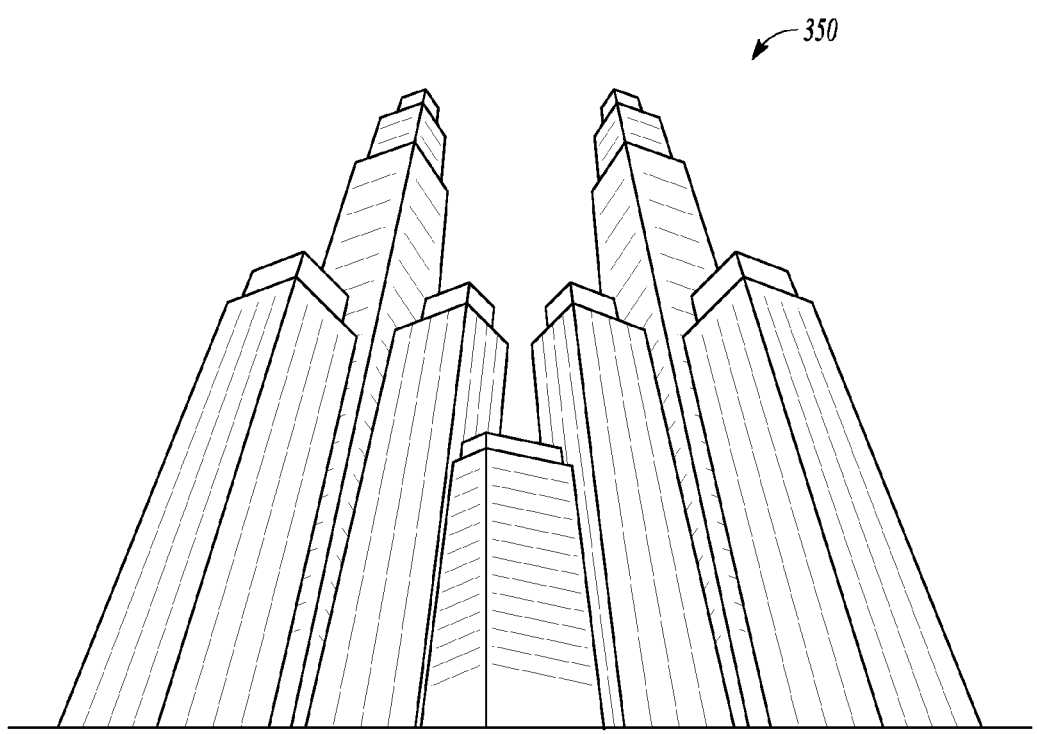
FIG. 3B shows an image generated by altering the perspective of the landscape image of FIG. 3A, in accordance with an example embodiment.

FIG. 3A shows an example landscape image 300, in accordance with an example embodiment. FIG. 3B shows an image 350 generated by altering the perspective of the landscape image 300 of FIG. 3A, in accordance with an example embodiment. As illustrated in FIG. 3B, the image 350 gives the illusion that the top of each building is narrower than its bottom, thereby generating the feeling of looking up at the buildings from the base of the buildings.

In one example embodiment, an image, such as the landscape image 300, is processed to alter the perspective of the image to generate, for example, the image 350. The landscape image 300 may be altered by removing a number of pixels from each row or each column of the image. The number of pixels removed from each row or column may be specified by a perspective reduction ratio. The perspective reduction ratio may indicate the reduction in pixel count for each row or column nearest to the altered side of the image. For example, in a top-side reduction, a perspective reduction ratio of 10% means that the altered top row of the image contains 10% fewer pixels than the original top row of the image. The number of pixels removed from the remaining rows or columns of the image may be a specific percentage of the pixels within each row or column or may be based on a function, such as an exponential function. In one example embodiment, the percentage of pixels removed from each row or column is based on the position of the row or column in the image. For example, in a top-side perspective reduction, no pixels may be removed from the bottom row of an image and the number of pixels removed from a row may linearly increase as the distance of the row from the bottom of the image increases. In another example, the number of pixels removed from a row non-linearly increases as the distance of the row from the bottom of the image increases, as described more fully below.

In another example, a perspective of a right side or a left side of an image may be altered by rotating the image 90 degrees. For example, the side of the image which is to be the most narrow (i.e., have the greatest number of pixels removed) may be rotated 90 degrees until it is located at the top of the image. In this manner, the same method may be used to alter the perspective of the image. Similarly, the bottom side of the image may be rotated 180 degrees until the original bottom side of the image is located at the top of the rotated image.

Figure 4A:
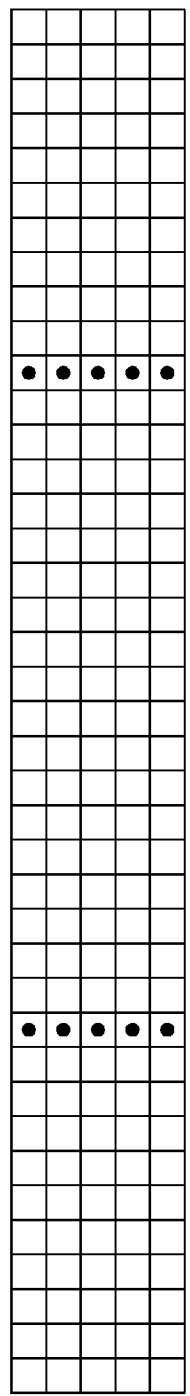
FIG. 4A shows portions of five rows of the example image of FIG. 3A prior to processing, in accordance with an example embodiment.
Figure 4B:
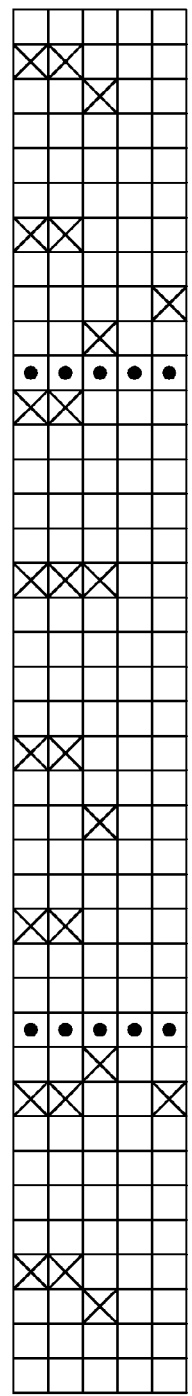
FIGS. 4B and 4C show portions of five rows of the example image of FIG. 3A after processing, in accordance with an example embodiment.
Figure 4C:
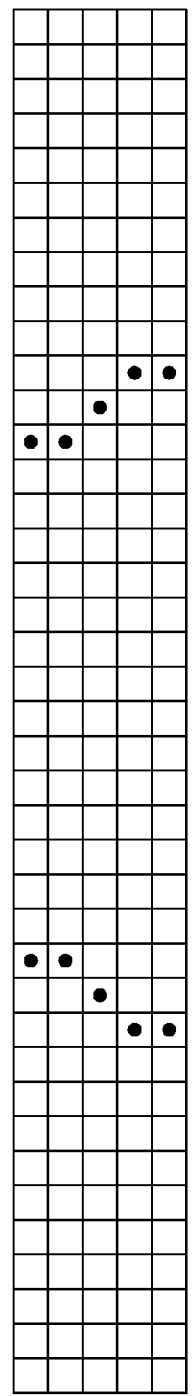

FIG. 4A shows portions 404 of five rows of the landscape image 300 of FIG. 3A prior to processing, in accordance with an example embodiment. As illustrated in FIG. 4A, each portion comprises 40 pixels. FIGS. 4B and 4C show the portions of five rows of the landscape image 300 of FIG. 3A after processing, in accordance with an example embodiment. As illustrated in FIG. 4B, the removed pixels have been replaced by null pixels (represented by "x" characters). As illustrated in FIG. 4C, the portions of the rows comprise only the pixels that remain after removal of the pixel(s). The processed image may be stored as illustrated in either FIG. 4B or FIG. 4C. In the case of FIG. 4B, the null pixels are removed during or prior to rendering, and before the image is displayed. In the case of FIG. 4C, the pixels are centered in the storage location for the corresponding row and rendered directly.

Figure 5:
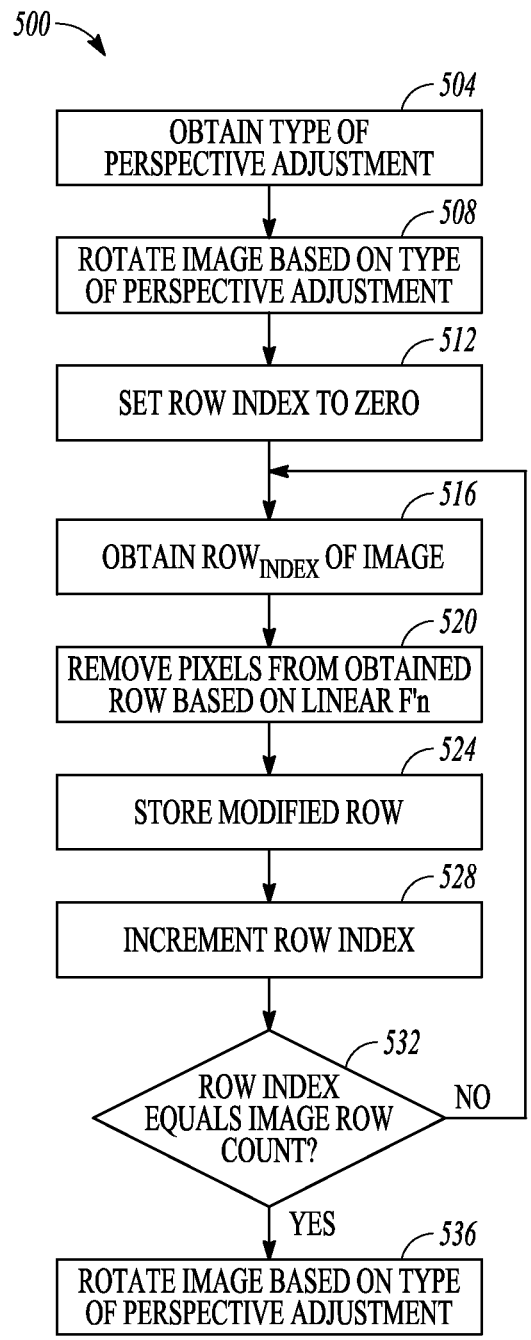
FIG. 5 is a flowchart of an example first method for altering a perspective of an image, in accordance with an example embodiment.

FIG. 5 is a flowchart of an example first method 500 for altering a perspective of an image, in accordance with an example embodiment. In one example embodiment, one or more of the operations of the method 500 may be performed by the image processing module 208 of FIG. 2. In one example embodiment, a type of perspective adjustment is obtained (operation 504). Example types of perspective adjustment include top-side, left-side, right-side, bottom-side, and the like. The image is then rotated, if necessary, based on the type of perspective adjustment (operation 508). For example, the image is rotated zero degrees if a top-side adjustment is to be performed, the image is rotated 90 degrees clockwise if a left-side adjustment is to be performed, the image is rotated 90 degrees counter-clockwise if a right-side adjustment is to be performed, and the image is rotated 180 degrees if a bottom-side adjustment is to be performed.

In one example embodiment, a row index is set to zero (operation 512) and the row identified by the row index is obtained (operation 516). For example, the first row of the image is obtained when the row index is equal to zero. Every nth pixel is then removed from the row (operation 520) where:

$$n = \frac{(\text{reduction ratio}) \times (\text{pixels}_{row}) \times (\text{row-count} - \text{row-index})}{(\text{row-count})}$$

For example, if 1) the image consists of 1,000 rows, 2) each row consists of 1,000 pixels, and 3) the perspective reduction ratio is 10% (meaning that the altered top row of the image contains 10% fewer pixels than the original top row of the image), then n equals 100 for the top row of the image, n equals 50 for the middle row, and n equals 0 for the bottom row of the image.

The modified row is then stored (operation 524). In one example embodiment, only the pixels that remain after the removal of the pixels (as described above) are stored in memory (in consecutive storage locations). In one example embodiment, the pixels that remain after the removal of the pixels are prepended and appended with m null pixels, where m equals 50% of the number of pixels that were removed from the corresponding row, thereby returning the pixel count for the corresponding row to the original pixel count of the row.

The row index is then incremented (operation 528) and a test is performed to determine if the row index equals the row count of the image (operation 532). If the row index does not equal the row count of the image, the method 500 proceeds with operation 516; otherwise, the image is rotated, if necessary, based on the type of perspective adjustment, to restore the image to its original orientation (operation 536). For example, the image is rotated zero degrees if a top side adjustment was performed, the image is rotated 90 degrees counter-clockwise if a left side adjustment was performed, the image is rotated 90 degrees clockwise if a right side adjustment was performed, and the image is rotated 180 degrees if a bottom side adjustment was performed. The method 500 then ends.

In one example embodiment, a predefined number of pixels before and after each removed pixel may be extrapolated to smooth the transition between the pixels that were near neighbors of the removed pixel. For example, the three pixels preceding and following the removed pixel may be extrapolated.

Figure 6:
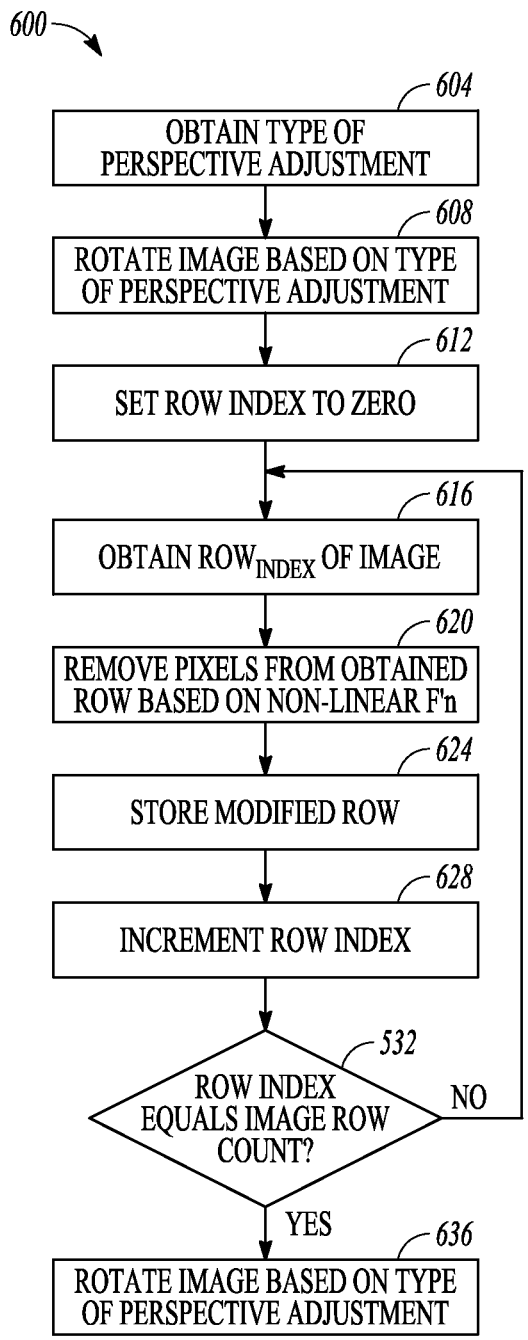
FIG. 6 is a flowchart of an example second method for altering a perspective of an image, in accordance with an example embodiment.

FIG. 6 is a flowchart of an example second method 600 for altering a perspective of an image, in accordance with an example embodiment. In the method 600, the number of pixels removed from each row is based on a non-linear function, such as an exponential function. In one example embodiment, one or more of the operations of the method 600 may be performed by the image processing module 208 of FIG. 2. In one example embodiment, a type of perspective adjustment is obtained (operation 604). Example types of perspective adjustment include top-side, left-side, right-side, bottom-side, and the like. The image is then rotated, if necessary, based on the type of perspective adjustment (operation 608). For example, the image is rotated zero degrees if a top-side adjustment is to be performed, the image is rotated 90 degrees clockwise if a left-side adjustment is to be performed, the image is rotated 90 degrees counter-clockwise if a right-side adjustment is to be performed, and the image is rotated 180 degrees if a bottom-side adjustment is to be performed.

In one example embodiment, a row index is set to zero (operation 612) and the row identified by the row index is obtained (operation 616). For example, the first row of the image is obtained when the row index is equal to zero. Every nth pixel is then removed from the row (operation 620) where:

$$n = (\text{reduction ratio}) \times (\text{pixels}_{row}) \times fn(\text{row-index})$$

The function $fn(x)$ can be any function that varies between zero and one for a row index that ranges from zero to the row count. For example, the function $fn(x)$ may be an exponential function. In one example, if 1) the image consists of 1,000 rows, 2) each row consists of 1,000 pixels, and 3) the perspective reduction ratio is 10% (meaning the top row of the image contains 10% fewer pixels than the original top row of the image), then n equals 100 for the top row of the image, n equals 35 for the middle row, and n equals 0 for the bottom row of the image.

The modified row is then stored (operation 624). In one example embodiment, only the pixels that remain after the removal of the pixels (as described above) are stored in memory (in consecutive storage locations). In one example embodiment, the pixels that remain after the removal of the pixels are prepended and appended with m null pixels, where m equals 50% of the number of pixels that were removed from the corresponding row, thereby returning the pixel count for the corresponding row to the original pixel count of the row.

The row index is then incremented (operation 628) and a test is performed to determine if the row index equals the row count of the image (operation 632). If the row index does not equal the row count of the image, the method 600 proceeds with operation 616; otherwise, the image is rotated, if necessary, based on the type of perspective adjustment to restore the image to its original orientation (operation 636). For example, the image is rotated zero degrees if a top-side adjustment was performed, the image is rotated 90 degrees counter-clockwise if a left-side adjustment was performed, the image is rotated 90 degrees clockwise if a right-side adjustment was performed, and the image is rotated 180 degrees if a bottom-side adjustment was performed. The method 600 then ends.

In one example embodiment, a predefined number of pixels before and after each removed pixel may be extrapolated to smooth the transition between the pixels that were near neighbors of the removed pixel. For example, the three pixels preceding and following the removed pixel may be extrapolated.

Figure 7:
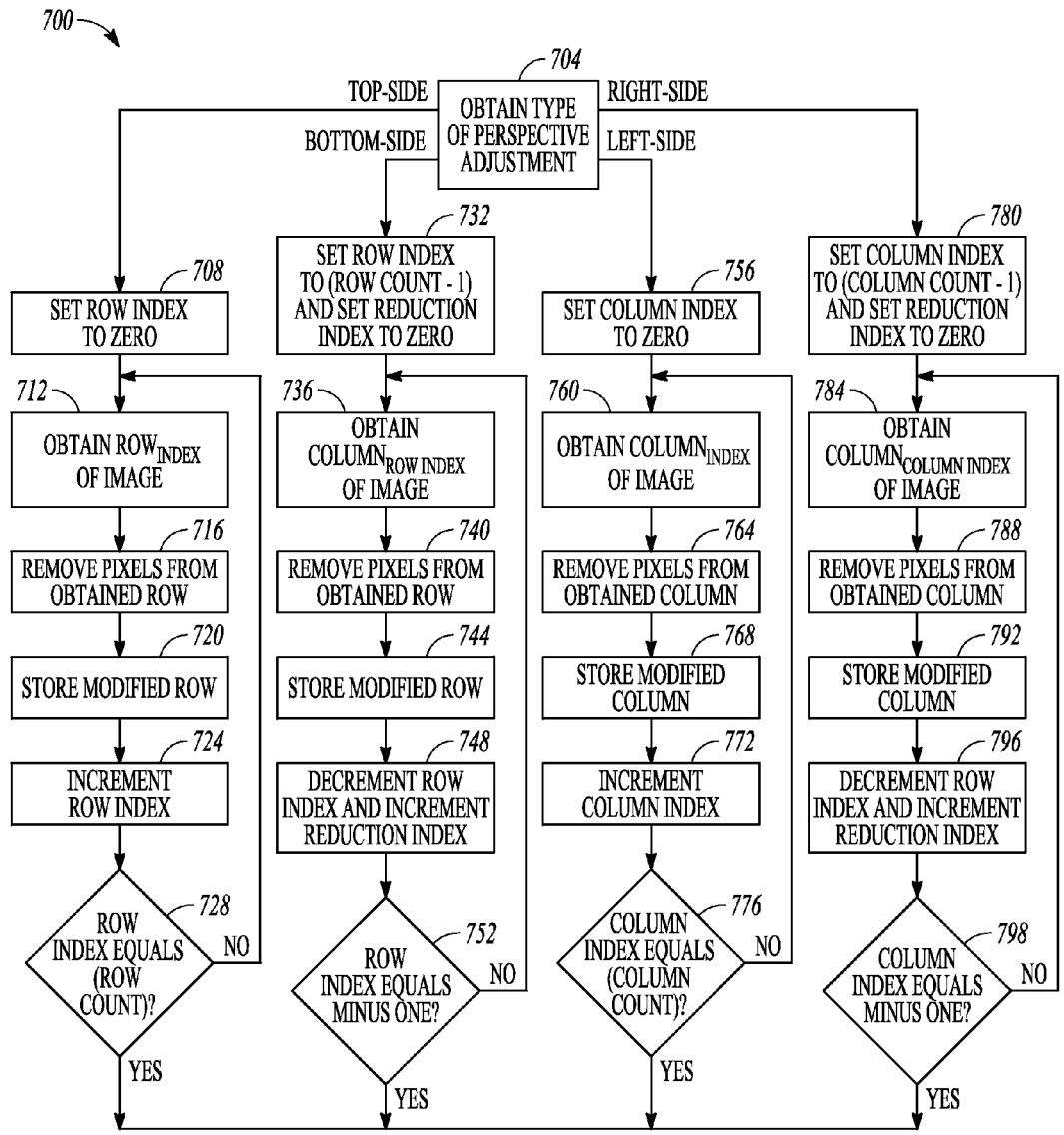
FIG. 7 is a flowchart of an example third method for altering a perspective of an image, in accordance with an example embodiment.

FIG. 7 is a flowchart of an example third method 700 for altering a perspective of an image, in accordance with an example embodiment. In the method 700, the image is not rotated prior to processing; rather, the processing is performed on a row-by-row or column-by-column basis based on the type of perspective adjustment. In one example embodiment, one or more of the operations of the method 700 may be performed by the image processing module 208 of FIG. 2.

In one example embodiment, a type of perspective adjustment is obtained (operation 704). Example types of perspective adjustment include top side, left side, right side, bottom side, and the like. If the type of perspective adjustment is a top-side adjustment, the method 700 proceeds with operation 708. If the type of perspective adjustment is a bottom-side adjustment, the method 700 proceeds with operation 732. If the type of perspective adjustment is a left-side adjustment, the method 700 proceeds with operation 756. If the type of perspective adjustment is a right-side adjustment, the method 700 proceeds with operation 780.

During operation 708, the row index is set to zero and the row identified by the row index is obtained (operation 712). Every nth pixel is then removed from the row (operation 716), as described above in conjunction with method 500 and 600. The modified row is then stored (operation 720). In one example embodiment, only the pixels that remain after the removal of the pixels (as described above) are stored in memory (in consecutive storage locations). In one example embodiment, the pixels that remain after the removal of the pixels are prepended and appended with m null pixels, where m equals 50% of the number of pixels that were removed from the corresponding row, thereby returning the pixel count for the corresponding row to the original pixel count of the row.

The row index is then incremented (operation 724) and a test is performed to determine if the row index equals the row count of the image (operation 728). If the row index does not equal the row count of the image, the method 700 proceeds with operation 712; otherwise, the method 700 ends.

During operation 732, the row index is set to the original row count of the image minus one and the reduction index is set to zero. The row identified by the row index is then obtained (operation 736). Every nth pixel is then removed from the obtained row (operation 740) where, for example $$n = \frac{(\text{reduction ratio}) \times (\text{pixels}_{row}) \times (\text{row-count} - \text{reduction-index})}{(\text{row-count})}$$

The modified row is then stored (operation 744). In one example embodiment, only the pixels that remain after the removal of the pixels (as described above) are stored in memory (in consecutive storage locations). In one example embodiment, the pixels that remain after the removal of the pixels are prepended and appended with m null pixels, where m equals 50% of the number of pixels that were removed from the corresponding row, thereby returning the pixel count for the corresponding row to the original pixel count of the row.

The row index is then decremented and the reduction index is incremented (operation 748) and a test is performed to determine if the row index equals minus one (operation 752). If the row index does not equal minus one, the method 700 proceeds with operation 736; otherwise, the method 700 ends.

During operation 756, the column index is set to zero and the column identified by the column index is obtained (operation 760). Every nth pixel is then removed from the obtained column (operation 764) where, for example:

$$n = \frac{(\text{reduction ratio}) \times (\text{pixels}_{column}) \times (\text{column-count} - \text{column-index})}{(\text{column-count})}$$

The modified column is then stored (operation 768). In one example embodiment, only the pixels that remain after the removal of the pixels (as described above) are stored in memory (in consecutive storage locations). In one example embodiment, the pixels that remain after the removal of the pixels are prepended and appended with m null pixels, where m equals 50% of the number of pixels that were removed from the corresponding column, thereby returning the pixel count for the corresponding column to the original pixel count of the column.

The column index is then incremented (operation 772) and a test is performed to determine if the column index equals the column count of the image (operation 776). If the column index does not equal the column count of the image, the method 700 proceeds with operation 760; otherwise, the method 700 ends.

During operation 780, the column index is set to the column count of the image minus one and the reduction index is set to zero. The column identified by the column index is then obtained (operation 784). Every nth pixel is then removed from the obtained column (operation 788) where, for example $$n = \frac{(\text{reduction ratio}) \times (\text{pixels}_{column}) \times (\text{column-count} - \text{reduction-index})}{(\text{column-count})}$$

The modified column is then stored (operation 792). In one example embodiment, only the pixels that remain after the removal of the pixels (as described above) are stored in memory (in consecutive storage locations). In one example embodiment, the pixels that remain after the removal of the pixels are prepended and appended with m null pixels, where m equals 50% of the number of pixels that were removed from the corresponding column, thereby returning the pixel count for the corresponding column to the original pixel count of the column.

The column index is then decremented and the reduction index is incremented (operation 796) and a test is performed to determine if the column index equals minus one (operation 798). If the column index does not equal minus one, the method 700 proceeds with operation 784; otherwise, the method 700 ends.

In one example embodiment, a predefined number of pixels before and after each removed pixel may be extrapolated to smooth the transition between the pixels that were near neighbors of the removed pixel. For example, the three pixels preceding and following the removed pixel may be extrapolated.

Although certain examples are shown and described here, other variations exist and are within the scope of the invention. It will be appreciated, by those of ordinary skill in the art, that any arrangement, which is designed or arranged to achieve the same purpose, may be substituted for the specific embodiments shown. This application is intended to cover any adaptations or variations of the example embodiments of the invention described herein. It is intended that this invention be limited only by the claims, and the full scope of equivalents thereof.

Example Mobile Device

Figure 8:
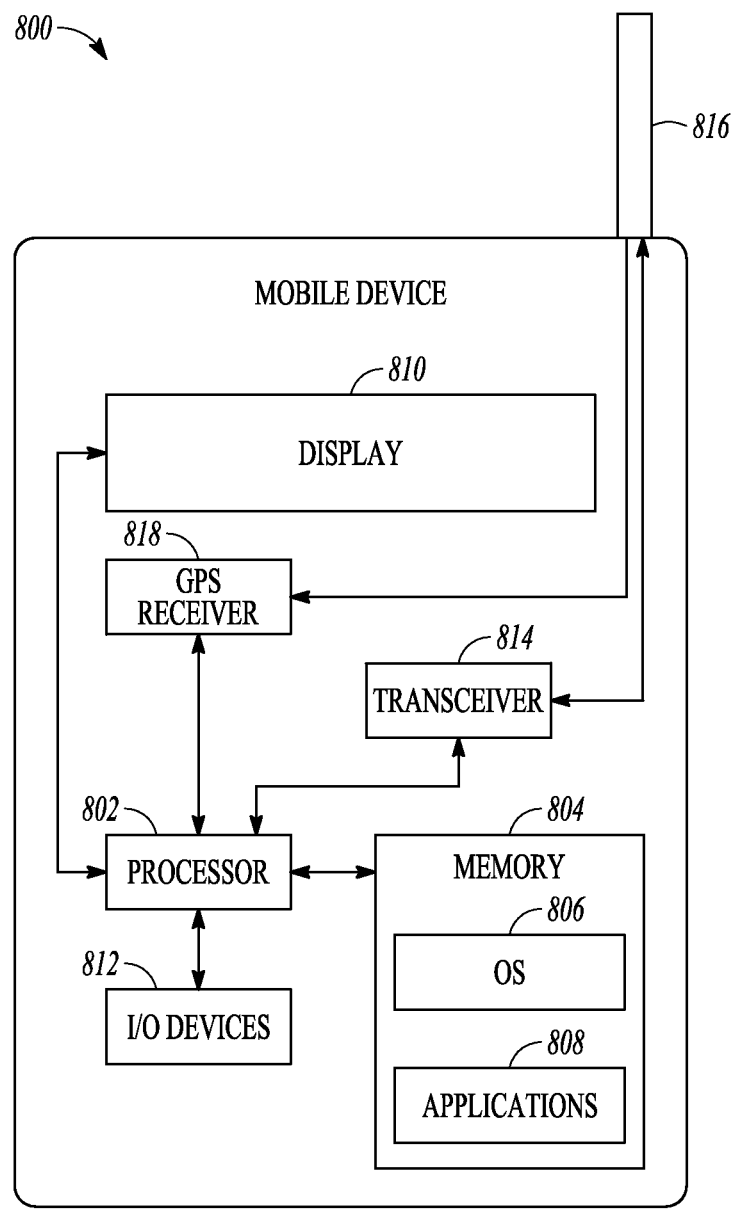
FIG. 8 is a block diagram illustrating an example mobile device, according to an example embodiment.

FIG. 8 is a block diagram illustrating an example mobile device 800, according to an example embodiment. The mobile device 800 may include a processor 802. The processor 802 may be any of a variety of different types of commercially available processors suitable for mobile devices (for example, an XScale architecture microprocessor, a microprocessor without interlocked pipeline stages (MIPS) architecture processor, or another type of processor 802). A memory 804, such as a random access memory (RAM), a flash memory, or another type of memory, is typically accessible to the processor 802. The memory 804 may be adapted to store an operating system (OS) 806, as well as application programs 808, such as a mobile location enabled application that may provide location-based services (LBSs) to a user. The processor 802 may be coupled, either directly or via appropriate intermediary hardware, to a display 810 and to one or more input/output (I/O) devices 812, such as a keypad, a touch panel sensor, a microphone, and the like. Similarly, in some embodiments, the processor 802 may be coupled to a transceiver 814 that interfaces with an antenna 816. The transceiver 814 may be configured to both transmit and receive cellular network signals, wireless data signals, or other types of signals via the antenna 816, depending on the nature of the mobile device 800. Further, in some configurations, a GPS receiver 818 may also make use of the antenna 816 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
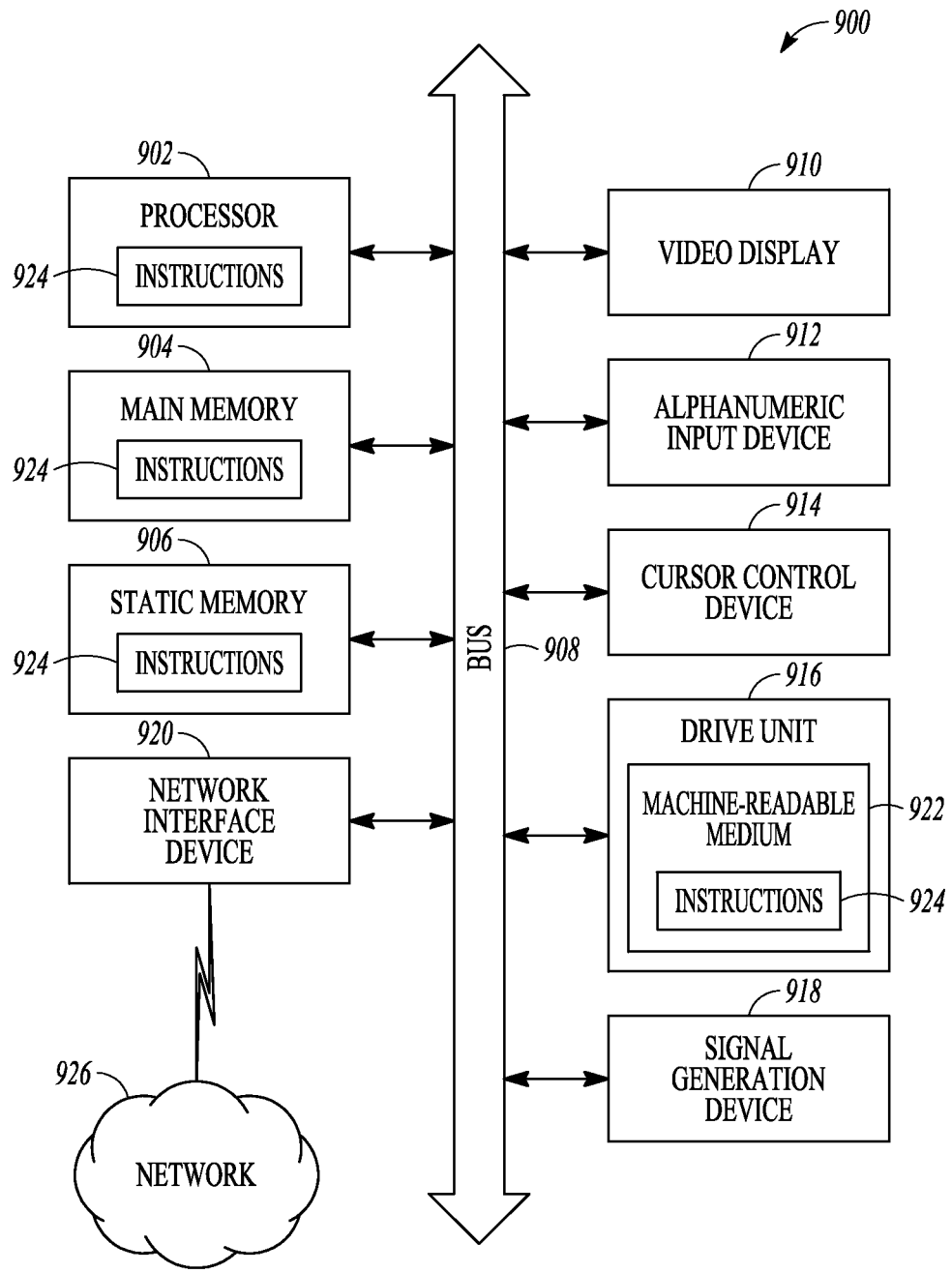
FIG. 9 is a block diagram of a machine within which instructions may be executed for causing the machine to perform any one or more of the methodologies discussed herein.

FIG. 9 is a block diagram of a machine within which instructions may be executed for causing the machine to perform any one or more of the methodologies discussed herein. In one example embodiment, the machine may be the example apparatus 200 of FIG. 2 for altering a perspective of an image. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker), and a network interface device 920.

Machine-Readable Medium

The drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media 922. The instructions 924 may also reside within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more data structures or instructions 924. The term "machine-readable medium" shall also be taken to include any tangible medium that is capable of storing, encoding, or carrying instructions 924 for execution by the machine and that cause the machine to perform any one or more of the methodologies of the present invention, or that is capable of storing, encoding, or carrying data structures utilized by or associated with such instructions 924. The term "machine-readable medium" shall accordingly be taken to include, but not be limited to, solid-state memories and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., hypertext transfer protocol (HTTP)). Examples of communications networks 926 include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying the instructions 924 for execution by the machine, and includes digital or analog communications signals or other intangible media to facilitate communication of such instructions 924.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for altering a perspective of an image, the method comprising:
    obtaining a selection of a type of perspective reduction from a plurality of types of perspective reduction, the selection obtained from an user interface module that provides access to a perspective reduction application, each respective type of perspective reduction resulting in a gradual and spatial narrowing of the perspective of the image toward a different selected side of the image, the types of perspective reduction comprising a left-side type perspective reduction indicating a 90 degree clockwise rotation from an original orientation, a bottom-side type perspective reduction indicating a 180 degree rotation from the original orientation, and a right-side type perspective reduction indicating a 90 degree counter-clockwise rotation from the original orientation;
    receiving a selection of a select type of perspective reduction;
    rotating the image from the original orientation to an intermediary orientation based on the select type of perspective reduction, wherein the intermediary orientation comprises one of: 90 degrees clockwise from the original orientation for the left-side type perspective reduction, 180 degrees from the original orientation for the bottom-side type perspective reduction, and 90 degrees counter-clockwise from the original orientation for the right-side type perspective reduction;
    removing one or more pixels from each of a plurality of rows of the image while the image is positioned in the intermediary orientation, wherein a quantity of pixels removed from each row of the image is determined by determining a value n for each respective row and removing the nth pixel from each respective row, wherein the value n for each respective row is determined using the formula: n=[(a reduction ratio)×(a number of pixels in the respective row)×(a total number of rows in the image−an index number of the respective row in the image)]/(the total number of rows in the image), wherein after removing the one or more pixels from each of the plurality of rows of the image, the top row includes less pixels than a bottom row of the image, and each row of the image that is positioned below the top row includes at least as many pixels as the top row of the image; and
    rotating the image to the original orientation after removing the one or more pixels.

2. The method of claim 1, wherein the quantity of pixels increases linearly based on a row count of the row.

3. The method of claim 1, wherein the quantity of pixels increases non-linearly based on a non-linear function and a row count of the row.

4. The method of claim 3, wherein the non-linear function is an exponential function.

5. The method of claim 1, wherein the selection is obtained from a user.

6. The method of claim 1, wherein the selection of the type of perspective reduction identifies a border edge of the image that receives the greatest amount of perspective reduction.

7. A system comprising:
    one or more computer processors; and
    one or more computer-readable mediums storing instructions that, when executed by the one or more computer processors, cause the system to perform operations comprising:
        obtaining a selection of a type of perspective reduction from a plurality of types of perspective reduction, the selection obtained from an user interface module that provides access to a perspective reduction application, each respective type of perspective reduction resulting in a gradual and spatial narrowing of the perspective of the image toward a different selected side of the image, the types of perspective reduction comprising a left-side type perspective reduction indicating a 90 degree clockwise rotation from an original orientation, a bottom-side type perspective reduction indicating a 180 degree rotation from the original orientation, and a right-side type perspective reduction indicating a 90 degree counter-clockwise rotation from the original orientation;
        receiving a selection of a select type of perspective reduction;
        rotating the image from the original orientation to an intermediary orientation based on the select type of perspective reduction, wherein the intermediary orientation comprises one of: 90 degrees clockwise from the original orientation for the left-side type perspective reduction, 180 degrees from the original orientation for the bottom-side type perspective reduction, and 90 degrees counter-clockwise from the original orientation for the right-side type perspective reduction;
        removing one or more pixels from each of a plurality of rows of the image while the image is positioned in the intermediary orientation, wherein a quantity of pixels removed from each row of the image is determined by determining a value n for each respective row and removing the nth pixel from each respective row, wherein the value n for each respective row is determined using the formula: n=[(a reduction ratio)×(a number of pixels in the respective row)×(a total number of rows in the image−an index number of the respective row in the image)]/(the total number of rows in the image), wherein after removing the one or more pixels from each of the plurality of rows of the image, the top row includes less pixels than a bottom row of the image, and each row of the image that is positioned below the top row includes at least as many pixels as the top row of the image; and rotating the image to the original orientation after removing the one or more pixels.

8. The system of claim 7, wherein the quantity of pixels increases linearly based on a row count of the row.

9. The system of claim 7, wherein the quantity of pixels increases non-linearly based on a non-linear function and a row count of the row.

10. The system of claim 9, wherein the non-linear function is an exponential function.

11. The system of claim 7, wherein the selection is obtained from a user.

12. The system of claim 7, wherein the selection of the type of perspective reduction identifies a border edge of the image that receives the greatest amount of perspective reduction.

13. A non-transitory computer-readable medium storing instructions that, when executed by one or more computer processors of a computing device, cause the computing device to perform operations comprising:

obtaining a selection of a type of perspective reduction from a plurality of types of perspective reduction, the selection obtained from an user interface module that provides access to a perspective reduction application, each respective type of perspective reduction resulting in a gradual and spatial narrowing of the perspective of the image toward a different selected side of the image, the types of perspective reduction comprising a left-side type perspective reduction indicating a 90 degree clockwise rotation from an original orientation, a bottom-side type perspective reduction indicating a 180 degree rotation from the original orientation, and a right-side type perspective reduction indicating a 90 degree counter-clockwise rotation from the original orientation;

receiving a selection of a select type of perspective reduction;

rotating the image from the original orientation to an intermediary orientation based on the select type of perspective reduction, wherein the intermediary orientation comprises one of: 90 degrees clockwise from the original orientation for the left-side type perspective reduction, 180 degrees from the original orientation for the bottom-side type perspective reduction, and 90 degrees counter-clockwise from the original orientation for the right-side type perspective reduction;

removing one or more pixels from each of a plurality of rows of the image while the image is positioned in the intermediary orientation, wherein a quantity of pixels removed from each row of the image is determined by determining a value n for each respective row and removing the nth pixel from each respective row, wherein the value n for each respective row is determined using the formula: n=[(a reduction ratio)×(a number of pixels in the respective row)×(a total number of rows in the image–an index number of the respective row in the image)]/(the total number of rows in the image), wherein after removing the one or more pixels from each of the plurality of rows of the image, the top row includes less pixels than a bottom row of the image, and each row of the image that is positioned below the top row includes at least as many pixels as the top row of the image: and rotating the image to the original orientation after removing the one or more pixels.

14. The non-transitory computer-readable medium of claim 13, wherein the quantity of pixels increases linearly based on a row count of the row.

15. The non-transitory computer-readable medium of claim 13, wherein the quantity of pixels increases non-linearly based on a non-linear function and a row count of the row.

16. The non-transitory computer-readable medium of claim 15, wherein the non-linear function is an exponential function.

17. The non-transitory computer-readable medium of claim 13, wherein the selection is obtained from a user.

18. The non-transitory computer-readable medium of claim 13, wherein the selection of the type of perspective reduction identifies a border edge of the image that receives the greatest amount of perspective reduction.

* * * * *

UNITED STATES PATENT AND TRADEMARK OFFICE
CERTIFICATE OF CORRECTION

PATENT NO. : 10,147,155 B2
APPLICATION NO. : 14/555177
DATED : December 4, 2018
INVENTOR(S) : Hodges et al.

Page 1 of 1

It is certified that error appears in the above-identified patent and that said Letters Patent is hereby corrected as shown below:

In the Claims

In Column 15, Line 32, in Claim 13, after "type", delete "¶"

Signed and Sealed this
Tenth Day of March, 2020

Andrei Iancu
*Director of the United States Patent and Trademark Office*